(12) United States Patent
Kim et al.

(10) Patent No.: US 11,796,193 B2
(45) Date of Patent: Oct. 24, 2023

(54) AIR CONDITIONER

(71) Applicant: SAMSUNG ELECTRONICS CO., LTD., Suwon-si (KR)

(72) Inventors: Sung Woo Kim, Suwon (KR); Jong Youb Kim, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 17/426,255

(22) PCT Filed: Jan. 22, 2020

(86) PCT No.: PCT/KR2020/001122
§ 371 (c)(1),
(2) Date: Jul. 28, 2021

(87) PCT Pub. No.: WO2020/159151
PCT Pub. Date: Aug. 6, 2020

(65) Prior Publication Data
US 2022/0099311 A1 Mar. 31, 2022

(30) Foreign Application Priority Data
Jan. 29, 2019 (KR) .................. 10-2019-0011054

(51) Int. Cl.
*F24F 1/029* (2019.01)
*F24F 1/0323* (2019.01)
(Continued)

(52) U.S. Cl.
CPC .............. *F24F 1/029* (2019.02); *F24F 1/027* (2013.01); *F24F 1/0284* (2019.02); *F24F 1/035* (2019.02); *F24F 1/0323* (2019.02); *F24F 13/224* (2013.01)

(58) Field of Classification Search
CPC ........ F24F 2013/225; F24F 1/42; F24F 1/039; F24F 13/224; F24F 1/027; F24F 1/035; F24F 1/0284; F24F 1/0323; F24F 1/029
See application file for complete search history.

(56) References Cited

U.S. PATENT DOCUMENTS 2,293,482 A  8/1942  Ambrose
4,347,708 A * 9/1982  Bussjager ............. F24F 1/0323
                                                    62/DIG. 16
(Continued)

FOREIGN PATENT DOCUMENTS

CN          9-133402      5/1997
CN         1451089 A     10/2003
(Continued)

OTHER PUBLICATIONS

CN-103542466-A Translation (Year: 2014).*
(Continued)

*Primary Examiner* — Schyler S Sanks
(74) *Attorney, Agent, or Firm* — STAAS & HALSEY LLP (57) ABSTRACT

An air conditioner installable on a window frame and having a ventilation function. The air conditioner comprises a cabinet comprising a first inlet hole, a second inlet hole and a third inlet hole, a first heat exchanger provided inside the cabinet to allow indoor air, which is introduced through the first inlet hole, to exchange heat, a second heat exchanger provided inside the cabinet to allow outdoor air, which is introduced through the second inlet hole, to exchange heat, and a third heat exchanger provided inside the cabinet to be located between the first heat exchanger and the second heat exchanger in a height direction of the cabinet, and provided to allow outdoor air, which is introduced through the third
(Continued)

inlet hole, and condensed water, which is generated in the first heat exchanger, to exchange heat with each other.

17 Claims, 5 Drawing Sheets

(51) Int. Cl.
*F24F 1/0284* (2019.01)
*F24F 1/035* (2019.01)
*F24F 1/027* (2019.01)
*F24F 13/22* (2006.01)

(56) References Cited

U.S. PATENT DOCUMENTS

| | | | |
|---|---|---|---|
| 5,255,532 | A | 10/1993 | Chae et al. |
| 6,804,975 | B2 | 10/2004 | Park |
| 2013/0125574 | A1* | 5/2013 | Uselton ............ F24F 1/14 29/890.035 |
| 2017/0176027 | A1* | 6/2017 | Eicher ............ F24F 13/28 |

FOREIGN PATENT DOCUMENTS

| | | |
|---|---|---|
| CN | 1587839 A | 3/2005 |
| CN | 201589350 U | 9/2010 |
| CN | 103542466 A | 1/2014 |
| CN | 103542466 A * | 1/2014 |
| CN | 204043171 U | 12/2014 |
| CN | 106461239 A | 2/2017 |
| EP | 0 231 789 A2 | 8/1987 |
| EP | 0 231 789 A3 | 8/1987 |
| JP | 9-133402 | 5/1997 |
| JP | 2009-222328 | 10/2009 |
| JP | 2015-190694 | 11/2015 |
| JP | 2016-176685 | 10/2016 |
| JP | WO2017/029741 | 2/2017 |
| JP | 2020-3174 | 1/2020 |
| KR | 1998-058337 | 10/1998 |
| KR | 20-0153996 | 8/1999 |
| KR | 2001-0010617 | 2/2001 |
| KR | 2003-0065313 | 8/2003 |
| KR | 10-0459769 | 12/2004 |
| KR | 10-2006-0022442 | 3/2006 |
| KR | 10-2010-0124563 | 11/2010 |
| KR | 10-1122599 | 3/2012 |

OTHER PUBLICATIONS

Extended European Search Report dated Jan. 28, 2022 in European Application No. 20748242.3 (7 pages).
Chinese Office Action dated Jun. 28, 2022 in Chinese Application No. 202080011349.9 (8 pages; 7 pages English translation).
International Search Report, dated May 25, 2020, in International Application No. PCT/KR2020/001122 (5 pp.).
Written Opinion of the International Searching Authority, Form PCT/ISA/237 (4 pp.).
Notice of Allowance dated May 19, 2023 in Korean Patent Application No. 10-2019-0011054.
Office Action dated Apr. 28, 2023 in Chinese Patent Application No. 202080011349.9.
Office Action dated Feb. 25, 2023 in Chinese Patent Application No. 202080011349.9.

* cited by examiner

AIR CONDITIONER

CROSS-REFERENCE TO RELATED APPLICATION

This application is a U.S. National Stage Application, which claims the benefit under 35 U.S.C. § 371 of International Patent Application No. PCT/KR2020/001122, filed on Jan. 22, 2020, which claims the priority benefit of Korean Patent Application No. 10-2019-0011054, filed on Jan. 29, 2019, in the Korean Patent and Trademark Office, the disclosures of which are hereby incorporated by reference in their entirety.

BACKGROUND

Field

The present disclosure relates to an air conditioner, and more particularly, to an air conditioner capable of being installed on a window frame and having a ventilation function.

Description of the Related Art

In general, an air conditioner is a device that uses a refrigeration cycle to control temperature, humidity, and airflow distribution, and at the same time to remove dust from the air to achieve the comfortable environment for human activity. The refrigeration cycle may include a compressor, a condenser, an evaporator, an expansion valve, a blower fan, etc. as main components.

The air conditioner may be classified into a separate type air conditioner in which an indoor unit and an outdoor unit are separately installed, and an integrated air conditioner in which an indoor unit and an outdoor unit are installed together in one cabinet.

In some houses, it is difficult to install a separate type air conditioner because there is no space or structure for installing an outdoor unit. In such a case, an integrated air conditioner that is installable on a window frame may be considered. However, if the integrated air conditioner is installed on the window frame, it may cause difficulties in that the window is not closed and the window frame or the exterior of the house is damaged.

Particularly, in a case of a new apartment, it is illegal to install an outdoor unit on the outside of a window, and thus it is not easy to install an air conditioner unless an air conditioner is installed when an apartment is built.

The present disclosure is directed to providing an air conditioner having a slim shape so as to be easily installed on a window frame.

Further, the present disclosure is directed to providing an air conditioner having a ventilation function to maintain a comfortable indoor environment.

SUMMARY

One aspect of the present disclosure provides an air conditioner including a cabinet including a first inlet hole, a second inlet hole and a third inlet hole, a first heat exchanger provided inside the cabinet to allow indoor air, which is introduced through the first inlet hole, to exchange heat, a second heat exchanger provided inside the cabinet to allow outdoor air, which is introduced through the second inlet hole, to exchange heat, and a third heat exchanger provided inside the cabinet to be located between the first heat exchanger and the second heat exchanger in a height direction of the cabinet, and provided to allow outdoor air, which is introduced through the third inlet hole, and condensed water, which is generated in the first heat exchanger, to exchange heat with each other.

The condensed water generated in the first heat exchanger may be transferred to the second heat exchanger through the third heat exchanger.

Condensed water passed through the first heat exchanger and condensed water passed through the second heat exchanger may be discharged to an outside of the air conditioner in response to that an operation of the air conditioner stops.

The first heat exchanger may include a water collecting panel in which condensed water generated in the first heat exchanger is collected, and the condensed water collected in the water collecting panel may be moved to the third heat exchanger in response to that the third inlet hole is opened.

The second heat exchanger may include a distribution panel including a plurality of condensate distribution holes to allow condensed water, which passed through the third heat exchanger, to be distributed to the second heat exchanger, the distribution panel disposed on an upper end of the second heat exchanger, and a water collecting panel disposed at a lower end of the second heat exchanger to collect condensed water passed through the second heat exchanger.

The air conditioner may further include a damper configured to selectively open and close the third inlet hole.

The air conditioner may further include a filter replaceably disposed between the damper and the third heat exchanger.

The cabinet may further include a first outlet hole provided to allow air, which passed through the first heat exchanger, to be discharged into an indoor space. The air conditioner may further include a first duct provided to connect the first inlet hole, the third inlet hole, and the first outlet hole so as to allow the indoor air, which is introduced through the first inlet hole, to be discharged to the first outlet hole, and to allow the outdoor air, which is introduced through the third inlet hole, to be discharged to the first outlet hole.

The air conditioner may further include a first blower fan installed in the first duct to blow the air, which passed through the first heat exchanger, to the first outlet hole.

The cabinet may further include a second outlet hole provided to allow air, which passed through the second heat exchanger, to be discharged to an outdoor space. The air conditioner may further include a second duct provided to connect the second inlet hole to the second outlet hole, so as to allow the outdoor air, which is introduced through the second inlet hole, to be discharged to the second outlet hole.

The first duct and the second duct may be separated from each other to prevent air moving along the first duct and air moving along the second duct from mixing with each other.

The air conditioner may further include a second blower fan installed in the second duct to blow the air, which passed through the second heat exchanger, to the second outlet hole.

The air conditioner may further include a compressor provided inside the cabinet to be located below the second heat exchanger in the height direction of the cabinet, the compressor connected to the first heat exchanger and the second heat exchanger, respectively.

Another aspect of the present disclosure provides an air conditioner including a cabinet including a first inlet hole, a second inlet hole and a third inlet hole configured to be opened and closed, a first heat exchanger provided to allow indoor air, which is introduced through the first inlet hole, to exchange heat, a second heat exchanger provided to allow outdoor air, which is introduced through the second inlet hole, to exchange heat, and a third heat exchanger located between the first heat exchanger and the second heat exchanger, and provided to allow outdoor air, which is introduced through the third inlet hole, and condensed water, which is generated in the first heat exchanger, to exchange heat with each other in response to that the third inlet hole is opened.

The first heat exchanger, the second heat exchanger, and the third heat exchanger may be provided inside cabinet so that the third heat exchanger is located between the first heat exchanger and the second heat exchange in a height direction of the cabinet.

The condensed water generated in the first heat exchanger may be transferred to the second heat exchanger through the third heat exchanger.

The air conditioner may further include a damper configured to selectively open and close the third inlet hole.

The air conditioner may further include a filter replaceably disposed between the damper and the third heat exchanger.

The cabinet may further include a first outlet hole provided to allow air, which passed through the first heat exchanger, to be discharged to an indoor space. The air conditioner may further include a first flow path provided to allow indoor air, which is introduced into the first inlet hole, to be discharged to the first outlet hole by passing through the first heat exchanger, and a second flow path provided to allow outdoor air, which is introduced into the third inlet hole, to be discharged to the first outlet hole by sequentially passing through the third heat exchanger and the first heat exchanger, and connected to the first flow path through the first heat exchanger.

The cabinet may further include a second outlet hole provided to allow air, which passed through the second heat exchanger, to be discharged to an outdoor space. The air conditioner may further include a third flow path provided to allow outdoor air, which is introduced into the second inlet hole, to be discharged to the second outlet hole by passing through the second heat exchanger.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, exemplary embodiments of the present disclosure will be described in detail with reference to the accompanying drawings. On the other hand, In the following detailed description, the terms of "front end", "rear end", "upper portion", "lower portion", "upper end", "lower end" and the like may be defined by the drawings, but the shape and the location of the component is not limited by the term.

It is possible to implement ease of installation of an air conditioner on a window frame by arranging a first heat exchanger, a second heat exchanger, a third heat exchanger, and a compressor in one slim cabinet extending long in a height direction of a window.

It is possible to implement an air conditioner including a ventilating function as well as heating and cooling functions by allowing condensed water, which is generated in a first heat exchanger, to exchange heat with outdoor air, which is introduced through a third inlet hole, in a third heat exchanger.

A refrigeration cycle forming an air conditioner may include a compressor, a condenser, an expansion valve, and an evaporator. The refrigeration cycle circulates through a series of processes including compression-condensation-expansion-evaporation and may supply conditioned air that exchanges heat with a refrigerant.

The compressor compresses refrigerant gas into a high-temperature and high-pressure state and discharges the high-temperature and high-pressure refrigerant gas. The discharged refrigerant gas flows into the condenser. The condenser condenses the compressed refrigerant into a liquid state, and discharges heat to the environment through a condensation process.

The expansion valve expands the high-temperature and high-pressure liquid refrigerant, which is condensed in the condenser, into a low-pressure liquid refrigerant. The evaporator evaporates the refrigerant expanded in the expansion valve, and returns the refrigerant gas in the low-temperature and low-pressure state to the compressor. The evaporator may obtain the refrigeration effect by heat exchange with an object to be cooled by using the latent heat of evaporation of the refrigerant. By the refrigeration cycle, the air conditioner may control a temperature of an indoor space.

An outdoor unit of the air conditioner may include the compressor and an outdoor heat exchanger in the refrigeration cycle. An indoor unit of the air conditioner may include an indoor heat exchanger. The expansion valve may be included in any one of the indoor unit and the outdoor unit. The indoor heat exchanger may serve as any one of the condenser and the evaporator. The outdoor heat exchanger may serve as the other of the condenser and the evaporator. As an example, in response to that the indoor heat exchanger functions as the condenser, the air conditioner may be a heater. In response to that the indoor heat exchanger functions as the evaporator, the air conditioner may be a cooler.

The present disclosure relates to an integrated air conditioner in which an indoor unit and an outdoor unit are installed together in one cabinet. In the case of the integrated air conditioner, the condenser and the evaporator may be installed together in one cabinet.

The air conditioner according to the present disclosure may be an integrated air conditioner having at least one of a cooling function and a heating function. Hereinafter a case in which the air conditioner of the present disclosure is an integrated air conditioner having a cooling function will be mainly described.

Figure 1:
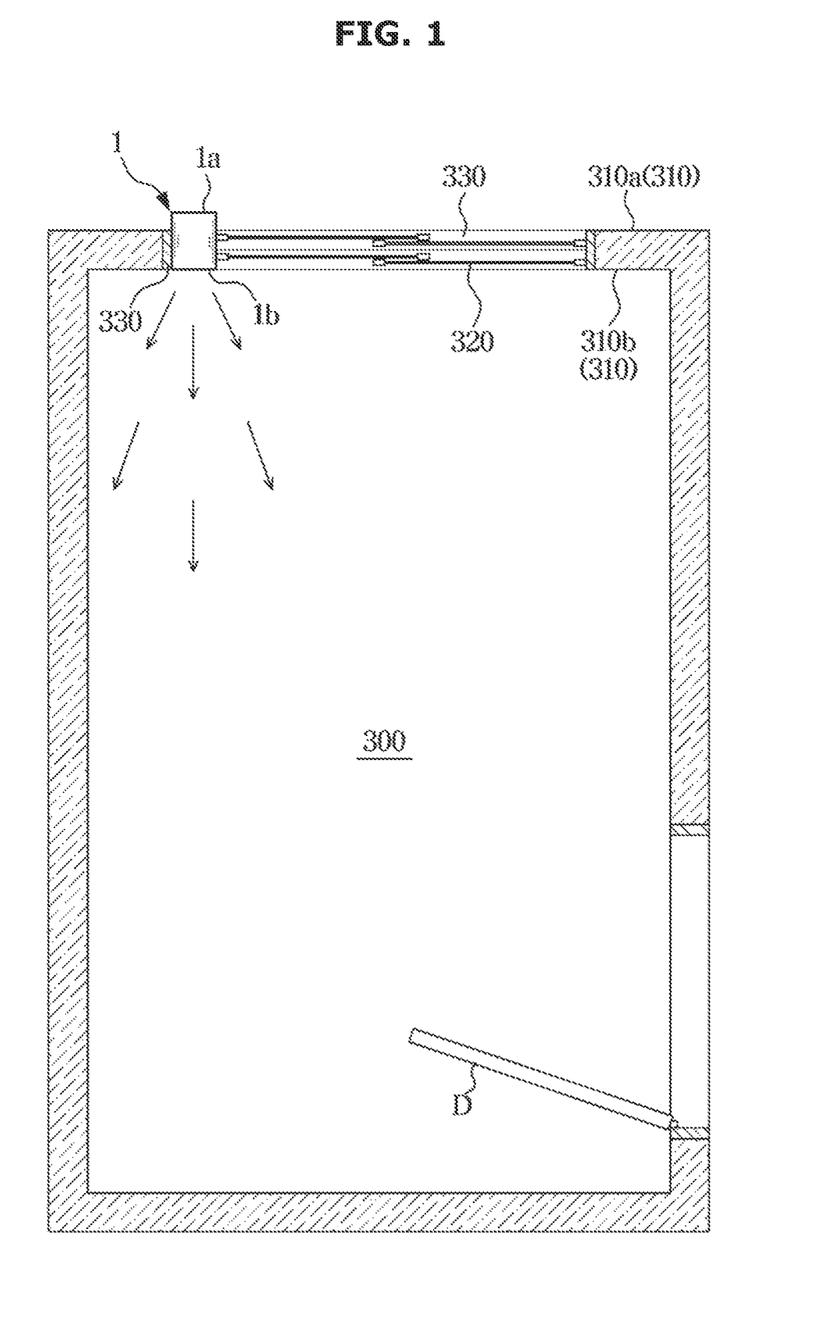
FIG. 1 is a schematic view illustrating a state in which an air conditioner according to one embodiment of the present disclosure is installed.
Figure 2:
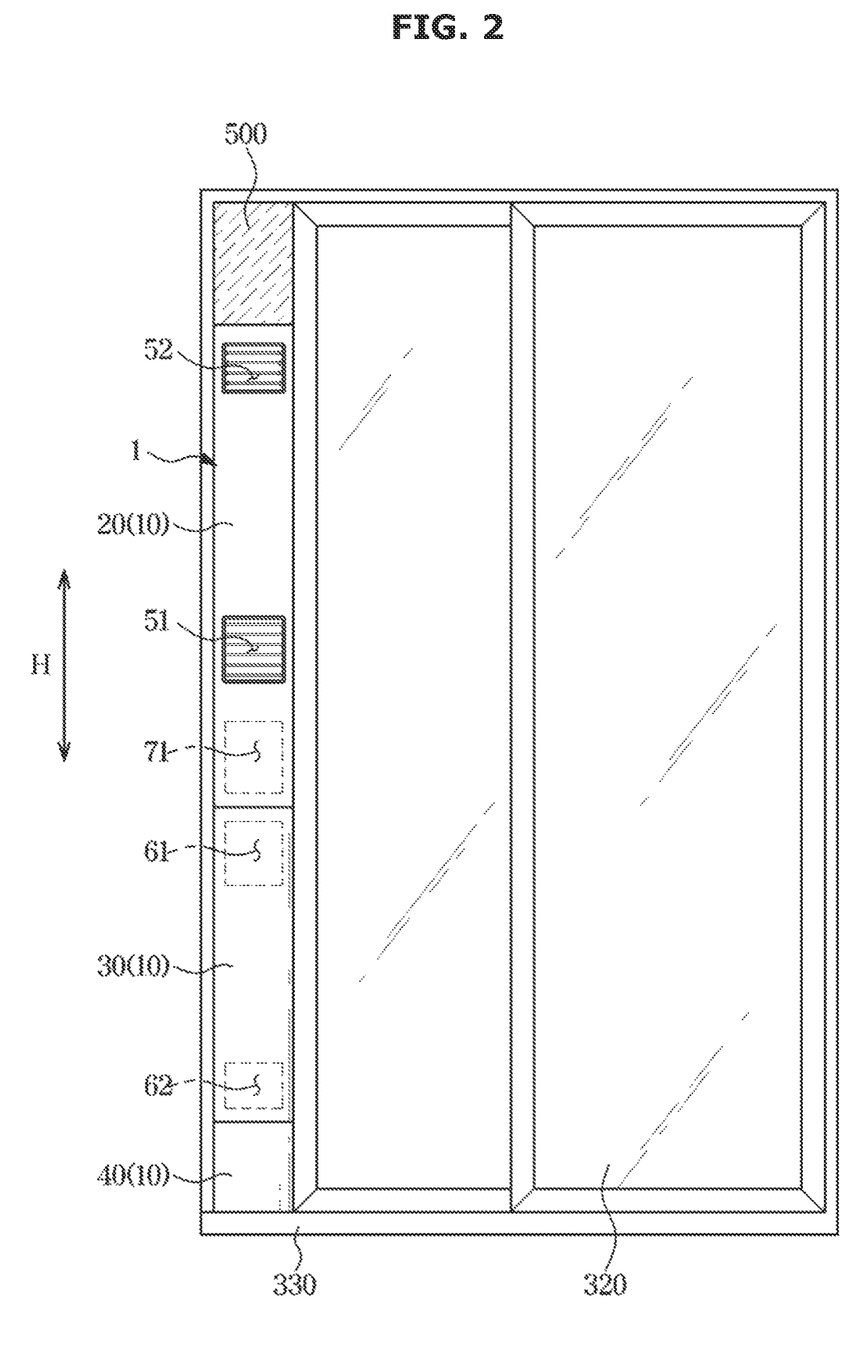
FIG. 2 is a view illustrating an installation structure of the air conditioner according to one embodiment of the present disclosure when viewed from an angle different from FIG. 1.
Figure 3:
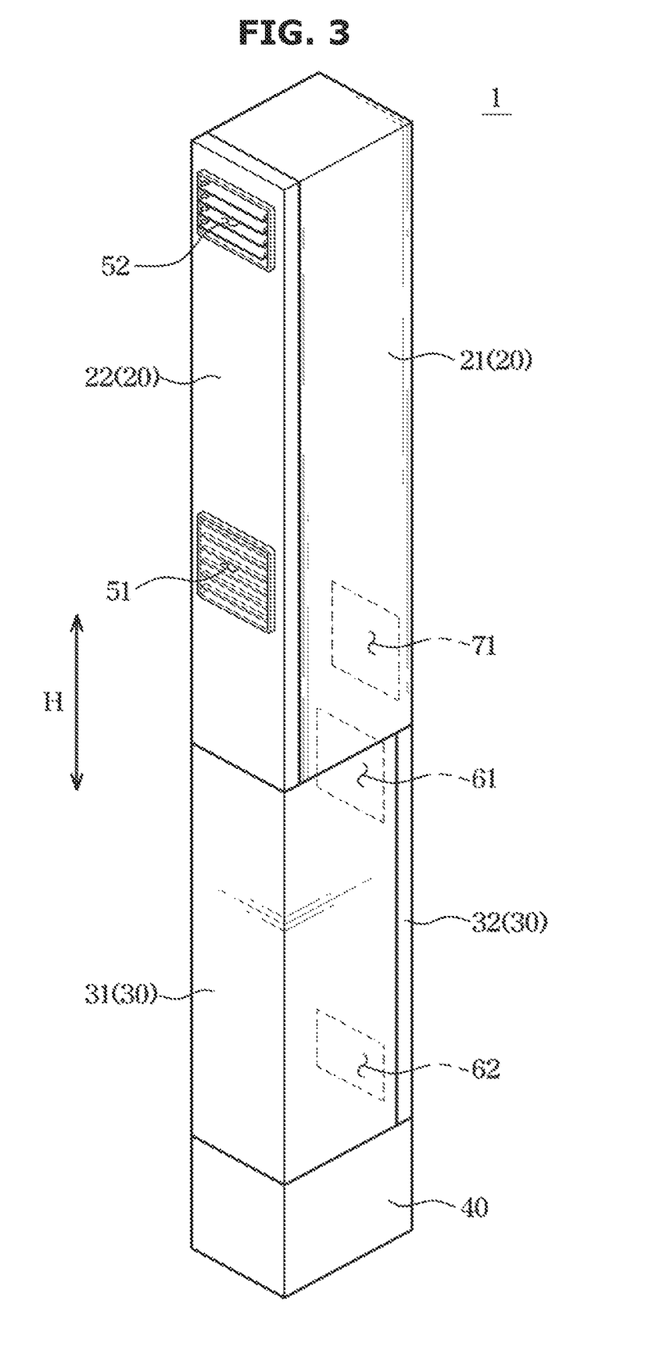
FIG. 3 is a schematic view illustrating the air conditioner according to one embodiment of the present disclosure.

FIG. 1 is a schematic view illustrating a state in which an air conditioner according to one embodiment of the present disclosure is installed, and FIG. 2 is a view illustrating an installation structure of the air conditioner according to one embodiment of the present disclosure when viewed from an angle different from FIG. 1. FIG. 3 is a schematic view illustrating the air conditioner according to one embodiment of the present disclosure. For reference, "D" in FIG. 1 refers to a door configured to open or close an indoor space 300. For reference, a direction of height H of a window 320, a height H of an air conditioner 1, and a height H of a cabinet 10 refer to the same direction.

As illustrated in FIGS. 1 to 3, the air conditioner 1 may be installed adjacent to the window 320 to maintain the indoor space 300 in a comfortable condition. As an example, the air conditioner 1 may be installed on a window frame 330 so as to be adjacent to the window 320. Alternatively, the air conditioner 1 may be installed on a wall 310, which defines the indoor space 300, so as to be adjacent to the window 320.

The air conditioner 1 may be installed to protrude to the outside of the indoor space 300. However, the installation type of the air conditioner 1 is not limited to the above example and thus may vary. As an example, the air conditioner 1 may be installed to protrude to an inside of the indoor space 300. Alternatively, the air conditioner 1 may be installed in such a way that an outer surface 1a of the air conditioner 1 facing the outside of the indoor space 300 is located on the same plane as an outer surface 310a of the wall 310 defining the indoor space 300 and an inner surface 1b of the air conditioner 1 facing the inside of the indoor space 300 is located on the same plane as an inner surface 310b of the wall 310 defining the indoor space 300.

The air conditioner 1 may have a slim shape extending in the height direction H of the window 320. As an example, the air conditioner 1 may have a slim hexahedral shape extending in the height direction H of the window 320. Because the slim-shaped air conditioner 1 does not require a large installation space, the air conditioner 1 may be installed on a window frame 330 without greatly occupying the installation space of the window 320. However, the shape of the air conditioner 1 is not limited to a hexahedron and may vary.

A height h1 of the air conditioner 1 may be less than a height h2 of the window 320. In this case, a space between the air conditioner 1 and the window frame 330 in the height direction H of the window 320 may be filled with a finishing material 500. Alternatively, the height h1 of the air conditioner 1 may be the same as the height h2 of the window 320.

The air conditioner 1 may include the cabinet 10 forming an exterior of the air conditioner 1. The cabinet 10 may include a top cabinet 20 in which a first heat exchanger 80 (refer to FIG. 4) is disposed, a middle cabinet 30 (refer to FIG. 4) in which a second heat exchanger 90 (refer to FIG. 4) is disposed, and a bottom cabinet 40 in which a compressor 170 (refer to FIG. 4) is disposed. The middle cabinet 30 may be positioned between the top cabinet 20 and the bottom cabinet 40 with respect to the height direction H of the window 320.

The top cabinet 20 may include a top cabinet body 21 including an open side facing the inside of the indoor space 300 and a top cabinet cover 22 provided to cover the open side of the top cabinet body 21. The top cabinet cover 22 may be removably coupled to the top cabinet body 21.

The middle cabinet 30 may include a middle cabinet body 31 including one open side facing the outside of the indoor space 300 and a middle cabinet cover 32 provided to cover the open side of the middle cabinet body 31. The middle cabinet cover 32 may be removably coupled to the middle cabinet body 31.

The air conditioner 1 may further include a first inlet hole 51 provided to allow indoor air to be introduced and a first outlet hole 52 provided to allow the indoor air introduced into the first inlet hole 51 to be discharged. The first inlet hole 51 and the first outlet hole 52 may be formed in the cabinet 10. Particularly, the first inlet hole 51 and the first outlet hole 52 may be formed on one surface of the cabinet 10 facing the inside of the indoor space 300. More particularly, the first inlet hole 51 and the first outlet hole 52 may be formed on the top cabinet cover 22 of the top cabinet 20. It is appropriate that the first outlet hole 52 is located above the first inlet hole 51 in the height direction H of the window 320.

The air conditioner 1 may further include a second inlet hole 61 provided to allow outdoor air to be introduced and the second outlet hole 62 provided to allow the outdoor air introduced into the second inlet hole 61 to be discharged. The second inlet hole 61 and the second outlet hole 62 may be formed in the cabinet 10. Particularly, the second inlet hole 61 and the second outlet hole 62 may be formed on one surface of the cabinet 10 facing the outside of the indoor space 300. More particularly, the second inlet hole 61 and the second outlet hole 62 may be formed on the middle cabinet cover 32 of the middle cabinet 30. It is appropriate that the second inlet hole 61 is located above the second outlet hole 62 in the height direction H of the window 320. In other words, the second outlet hole 62 may be located below the second heat exchanger 90 in the height direction H of the window 320 so as to prevent condensation heat, which may be generated in the second heat exchanger 90, from flowing into a third inlet hole 71. The condensation heat, which may be generated in the second heat exchanger 90, may be discharged to the outside of the indoor space 300 through the second outlet hole 62.

The air conditioner 1 may further include the third inlet hole 71 provided to perform a ventilation function. The third inlet hole 71 may be formed in the cabinet 10 to allow outdoor air to be introduced. Particularly, the third inlet hole 71 may be formed on one surface of the cabinet 10 facing the outside of the indoor space 300. More particularly, the third inlet hole 71 may be formed on one surface of the top cabinet body 21 of the top cabinet 20 facing the outside of the indoor space 300. It is appropriate that the third inlet hole 71 is located between the first inlet hole 51 and the second inlet hole 61 in the height direction H of the window 320. For ventilation of the indoor space 300, the outdoor air introduced into the third inlet hole 71 may be discharged through the first outlet hole 52.

Figure 4:
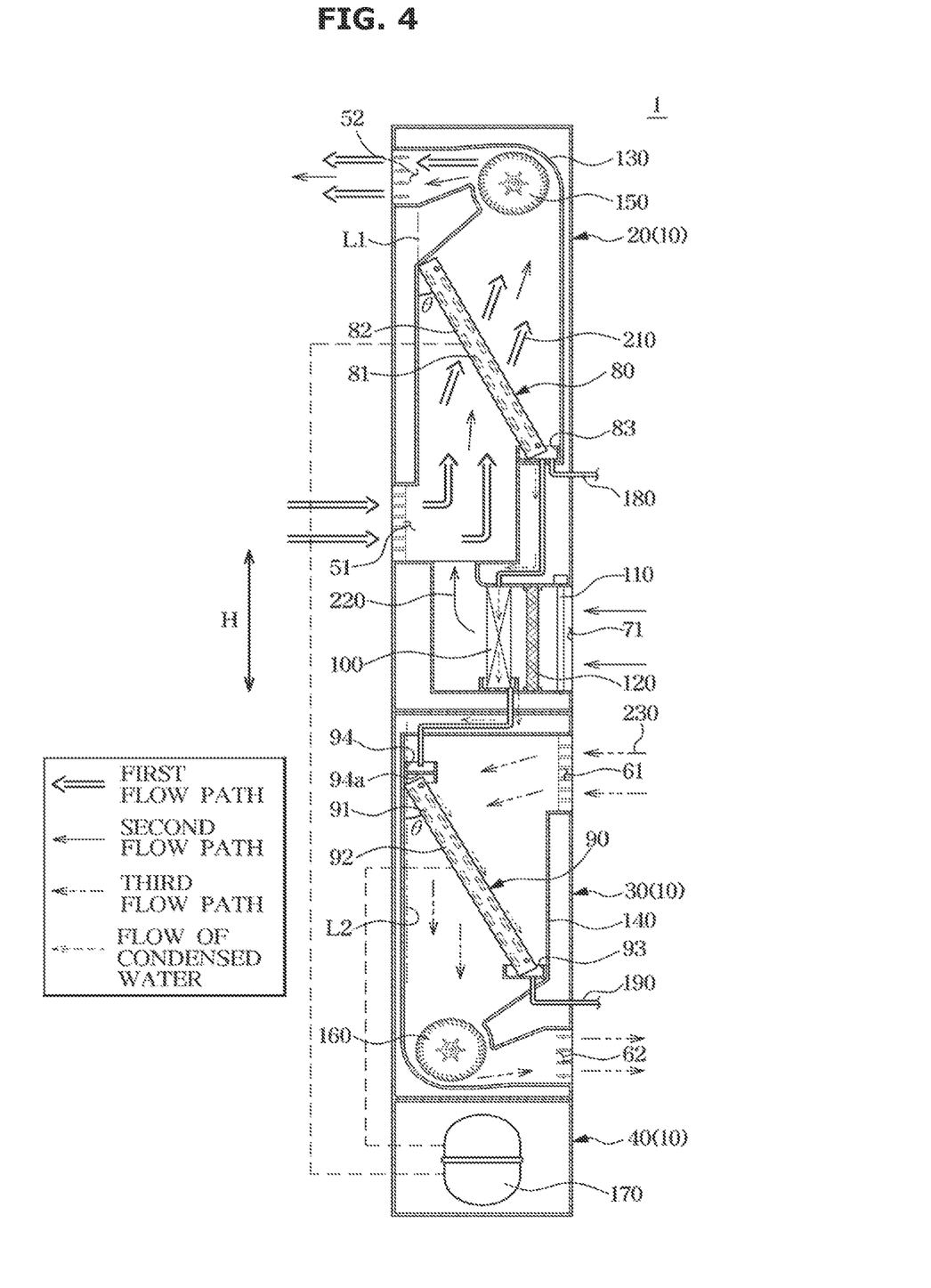
FIG. 4 is a schematic view illustrating an internal structure of the air conditioner according to one embodiment of the present disclosure.

FIG. 4 is a schematic view illustrating an internal structure of the air conditioner according to one embodiment of the present disclosure.

As illustrated in FIG. 4, the air conditioner 1 may further include the first heat exchanger 80 provided inside the cabinet 10 to allow indoor air, which is introduced through the first inlet hole 51, to exchange heat. Particularly, the first heat exchanger 80 may be provided inside the top cabinet 20. The first heat exchanger 80 may be used as an evaporator. The indoor air introduced into the first inlet hole 51 exchanges heat with the refrigerant in the first heat exchanger 80 and then is discharged into the indoor space 300 through the first outlet hole 52.

The first heat exchanger 80 may be disposed inside the top cabinet 20 to be inclined. The first heat exchanger 80 may be disposed inside the top cabinet 20 in such a way that the first heat exchanger 80 is inclined to the indoor space 300 or the outdoor space with respect to a reference line L1 that extends in the height direction H of the window 320 to pass an upper end of the first heat exchanger 80. By the arrangement of the first heat exchanger 80 as described above, the heat exchange efficiency of the first heat exchanger 80 may be improved.

The first heat exchanger 80 may include a refrigerant pipe 81, through which the refrigerant flows, a plurality of fins 82 coupled to an outer circumferential surface of the refrigerant pipe 81, and a water collecting panel 83 in which condensed water generated in the first heat exchanger 80 is collected. The water collecting panel 83 may be disposed at a lower end of the first heat exchanger 80 to facilitate collection of the condensed water generated in the first heat exchanger 80. In other words, the water collecting panel 83 may be disposed at a lower end of the plurality of fins 82 to collect the condensed water, which is formed on a surface of the plurality of fins 82, by gravity.

The air conditioner 1 may further include a first drain hose 180 coupled to the water collecting panel 83 to allow the condensed water generated in the first heat exchanger 80 to be discharged. The condensed water collected in the water collecting panel 83 may be naturally discharged through the first drain hose 180.

The air conditioner 1 may further include the second heat exchanger 90 provided inside the cabinet 10 to allow the outdoor air introduced into the second inlet hole 61 to exchange heat. Particularly, the second heat exchanger 90 may be provided inside the middle cabinet 30. The second heat exchanger 90 may be used as a condenser. The outdoor air introduced into the second inlet hole 61 exchanges heat with the refrigerant in the second heat exchanger 90, and then is discharged to the outside of the indoor space 300 through the second outlet hole 62.

The second heat exchanger 90 may be disposed inside the middle cabinet 30 to be inclined. The second heat exchanger 90 may be disposed inside the middle cabinet 30 in such a way that the second heat exchanger 90 is inclined to the indoor space 300 or the outdoor space with respect to a reference line L2 that extends in the height direction H of the window 320 to pass an upper end of the second heat exchanger 90. By the arrangement of the second heat exchanger 90 as described above, the heat exchange efficiency of the second heat exchanger 90 may be improved.

The second heat exchanger 90 may include a refrigerant pipe 91, through which the refrigerant flows, a plurality of fins 92 coupled to an outer circumferential surface of the refrigerant pipe 91, a distribution panel 94 provided to distribute condensed water, which passed through a third heat exchanger 100, to the second heat exchanger 90, and a water collecting panel 93 in which condensed water, which passed through the second heat exchanger 90, is collected. The distribution panel 94 may be disposed at an upper end of the second heat exchanger 90 and the water collecting panel 93 may be disposed at a lower end of the second heat exchanger 90. In other words, the distribution panel 94 may be disposed at an upper end of the plurality of fins 92, and the water collecting panel 93 may be disposed at a lower end of the plurality of fins 92. The distribution panel 94 may include a plurality of condensate distribution holes 94a. The condensed water that passed through the third heat exchanger 100 may be evenly distributed to the second heat exchanger 90 by passing through the plurality of condensate distribution holes 94a of the distribution panel 94. The condensed water that passed through the plurality of condensate distribution holes 94a flows on a surface of the plurality of fins 92 by gravity and then finally is collected in the water collecting panel 93.

The air conditioner 1 may further include a second drain hose 190 coupled to the water collecting panel 93 to allow the condensed water passed through the second heat exchanger 90 to be discharged. The condensed water collected in the water collecting panel 93 may be naturally discharged through the second drain hose 190.

The air conditioner 1 may further include the third heat exchanger 100 disposed inside the cabinet 10 to be positioned between the first heat exchanger 80 and the second heat exchanger 90 in the height direction H of the window 320. Particularly, the third heat exchanger 100 may be disposed in the top cabinet 20 together with the first heat exchanger 80. The outdoor air introduced into the third inlet hole 71 and the condensed water generated in the first heat exchanger 80 may exchange heat with each other in the third heat exchanger 100. The outdoor air introduced through the third inlet hole 71 may be cooled by exchanging heat with the condensed water generated in the first heat exchanger 80, and then discharged through the first outlet hole 52 so as to be used for ventilating the indoor space 300.

The air conditioner 1 may further include a damper 110 configured to selectively open and close the third inlet hole 71. The damper 110 may selectively open and close the third inlet hole 71 by various methods such as a rotation method and a sliding method.

The air conditioner 1 may further include a filter 120 replaceably disposed between the damper 110 and the third heat exchanger 100. The outdoor air introduced through the third inlet hole 71 may reach the third heat exchanger 100 through the filter 120.

The air conditioner 1 may further include a first duct 130 provided in the top cabinet 20. The indoor air introduced into the first inlet hole 51 may be discharged to the first outlet hole 52 through the first duct 130. The outdoor air introduced into the third inlet hole 71 may be discharged to the first outlet hole 52 through the first duct 130. The first duct 130 may connect the first inlet hole 51, the third inlet hole 71, and the first outlet hole 52.

The air conditioner 1 may further include a second duct 140 provided in the middle cabinet 30. The outdoor air introduced into the second inlet hole 61 may be discharged to the second outlet hole 62 through the second duct 140. The second duct 140 may connect the second inlet hole 61 and the second outlet hole 62.

The first duct 130 and the second duct 140 may be separated from each other to prevent mixing of the air moving along the first duct 130 with the air moving along the second duct 140. That is, the first duct 130 and the second duct 140 may be provided to not communicate with each other.

The air conditioner 1 may further include a first blower fan 150 configured to blow the air, which passed through the first heat exchanger 80, to the first outlet hole 52. The first blower fan 150 may be installed in the first duct 130. It is appropriate that the first blower fan 150 is installed in the first duct 130 to face the first outlet hole 52. The first blower fan 150 may include a sirocco fan. However, the type of the first blower fan 150 is not limited to the above example and thus may vary.

The air conditioner 1 may further include a second blower fan 160 configured to blow the air, which passed through the second heat exchanger 90, to the second outlet hole 62. The second blower fan 160 may be installed in the second duct 140. It is appropriate that the second blower fan 160 is installed in the second duct 140 to face the second outlet hole 62. The second blower fan 160 may include a sirocco fan, an axial fan, and a cross flow fan. However, the type of the second blower fan 160 is not limited to the above example and thus may vary.

The air conditioner 1 may further include the compressor 170 provided inside the cabinet 10 to be positioned below the second heat exchanger 90 in the height direction H of the window 320. The compressor 170 may be provided inside the bottom cabinet 40. The compressor 170 may be connected to the first heat exchanger 80 and the second heat exchanger 90. The compressor 170 may include a rotary compressor, a reciprocating compressor, and a scroll compressor. However, the type of the compressor 170 is not limited to the above example and thus may vary.

The air conditioner 1 may further include a sensor (not shown) configured to detect the surrounding environment to determine whether to perform ventilation or not. The sensor may include an indoor temperature sensor, an outdoor temperature sensor, a carbon dioxide sensor, a dust sensor, and an odor sensor. However, the type of the sensor is not limited to the above example and thus may vary.

The air conditioner 1 may further include a first flow path 210 provided to allow the indoor air, which is introduced into the first inlet hole 51, to be discharged to the first outlet hole 52 by passing through the first heat exchanger 80.

The air conditioner 1 may further include a second flow path 220 provided to allow the outdoor air, which is introduced to the third inlet hole 71, to be discharged to the first outlet hole 52 by sequentially passing through the third heat exchanger 100 and the first heat exchanger 80. The first flow path 210 and the second flow path 220 may be in contact with each other in the first heat exchanger 80.

The air conditioner 1 may further include a third flow path 230 provided to allow the outdoor air, which is introduced to the second inlet hole 61, to be discharged to the second outlet hole 62 by passing through the second heat exchanger 90. The third flow path 230 may be separated from the first flow path 210 and the second flow path 220. That is, the third flow path 230 may be provided not to be in contact with the first flow path 210 and the second flow path 220.

The condensed water generated in the first heat exchanger 80 may be discharged through the first drain hose 180 or may be discharged through the second drain hose 190 by passing through the third heat exchanger 100 and the second heat exchanger 90. Particularly, when ventilation of the indoor space 300 is required, the condensed water generated in the first heat exchanger 80 may be discharged through the second drain hose 190 by passing through the third heat exchanger 100 and the second heat exchanger 90. At this time, the condensed water generated in the first heat exchanger 80 may be moved to the third heat exchanger 100 and cool the outdoor air that is introduced through the third inlet hole 71, and then moved to the second heat exchanger 90 and cool the second heat exchanger 90. On the other hand, when ventilation of the indoor space 300 is not required, the condensed water generated in the first heat exchanger 80 may be discharged through the first drain hose 180.

In other words, in response to the third inlet hole 71 is opened, the condensed water generated in the first heat exchanger 80 may be moved to the third heat exchanger 100 and exchange heat with the outdoor air introduced through the third inlet hole 71. The condensed water heat-exchanged with the outdoor air introduced through the third inlet hole 71 in the third heat exchanger 100 may be discharged through the second drain hose 190 by passing through the second heat exchanger 90. On the other hand, in response to that the third inlet hole 71 is closed, the condensed water generated in the first heat exchanger 80 may be discharged through the first drain hose 180.

In a state in which the air conditioner 1 is operated, instead of being discharged directly through the first drain hose 180, the condensed water generated in the first heat exchanger 80 may be stored in the water collecting panel 83 of the first heat exchanger 80 and in response to that the third inlet hole 71 is opened, the stored condensed water may be supplied to the third heat exchanger 100. The condensed water supplied to the third heat exchanger 100 may exchange heat with the outdoor air, which is introduced into the third inlet hole 71, and be discharged to the second drain hose 190 by passing through the second heat exchanger 90. In this manner, because the condensed water generated in the first heat exchanger 80 is supplied to the third heat exchanger 100, it is possible to allow the condensed water generated in the first heat exchanger 80 to exchange heat with the outdoor air, which is introduced into the third inlet hole 71 and at the same time, the condensed water generated in the first heat exchanger 80 washes the third heat exchanger 100.

The air conditioner 1 may be controlled not only by manual control but also by remote control using a remote control or wireless communication network.

Figure 5:
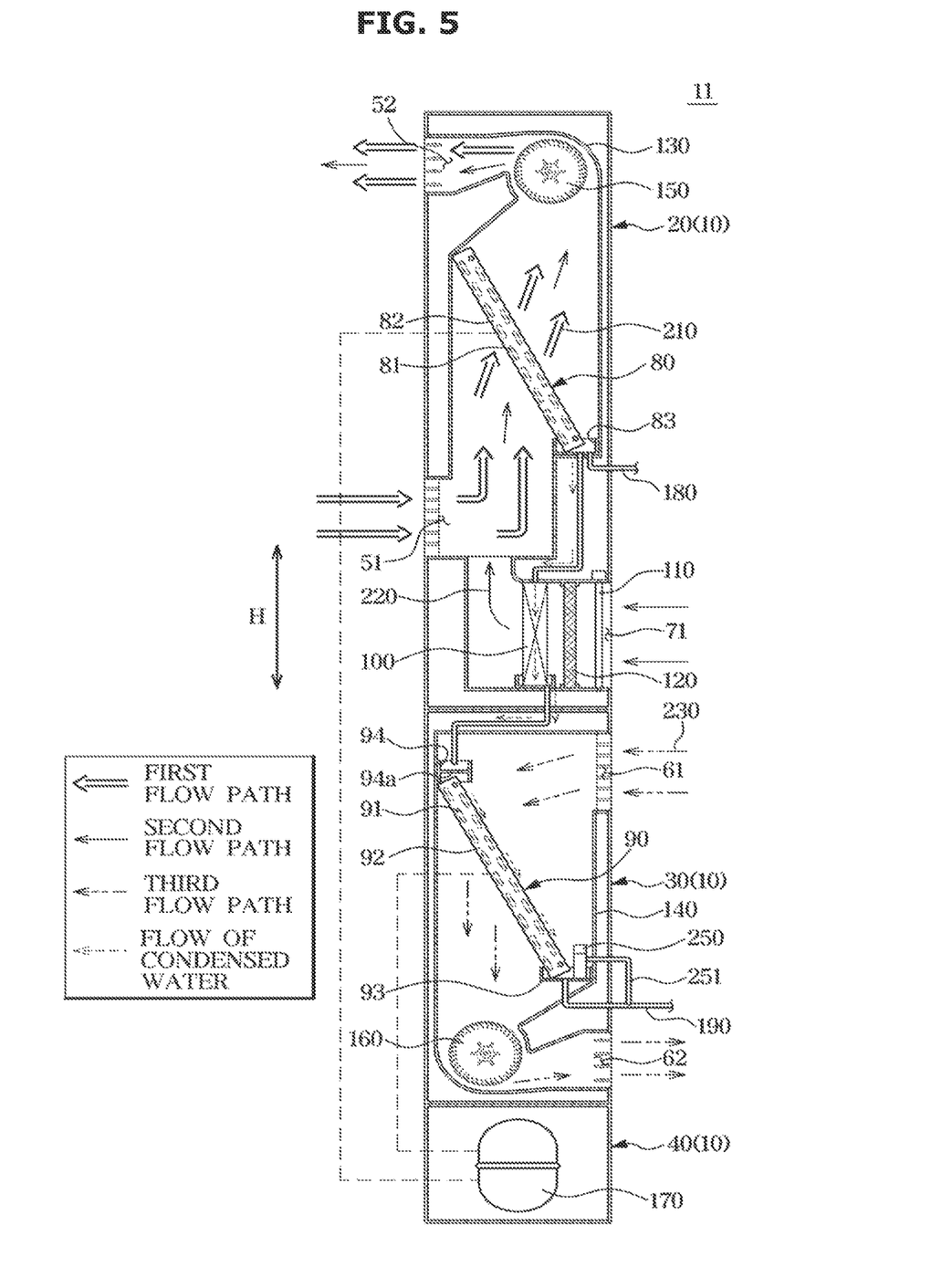
FIG. 5 is a schematic view illustrating an internal structure of an air conditioner according to another embodiment of the present disclosure.

FIG. 5 is a schematic view illustrating an internal structure of an air conditioner according to another embodiment of the present disclosure. Hereinafter a description the same as that described in FIG. 4 will be omitted. Hereinafter the same reference numerals are assigned to the components having the same names as the components described in FIG. 4.

As illustrated in FIG. 5, an air conditioner 11 may further include a drain pump 250 configured to forcibly discharge condensed water. When condensed water remains inside the air conditioner 11 even though the air conditioner 11 stops, the condensed water may contaminate the air conditioner 11. In order to keep the air conditioner 11 clean, the drain pump 250 may be operated to discharge the remaining condensed water in response to that the operation of the air conditioner 11 stops. Condensed water that is generated during the operation of the air conditioner 11 may be discharged in response to that the operation of the air conditioner 11 stops regardless of whether the third inlet hole 71 is opened or closed.

The drain pump 250 may be disposed adjacent to the second heat exchanger 90. As an example, the drain pump 250 may be disposed on the water collecting panel 93 or disposed adjacent to the water collecting panel 93 to forcedly discharge the condensed water remaining on the water collecting panel 93 of the second heat exchanger 90.

A drain hose 251 connected to the drain pump 250 may be connected to the second drain hose 190. Accordingly, in a state in which the drain pump 250 is operated, the condensed water remaining on the water collecting panel 93 is discharged through the drain hose 251 and the second drain hose 190. Even when the drain pump 250 is operated, the condensed water remaining on the water collecting panel 93 may be naturally discharged through the second drain hose 190.

In the above description, a case in which the drain pump 250 is disposed adjacent to the second heat exchanger 90 has been mainly described, but the arrangement position of the drain pump 250 is not limited to the above example. That is, the drain pump 250 may be disposed adjacent to at least one of the water collecting panel 83 of the first heat exchanger 80 and the water collecting panel 93 of the second heat exchanger 90.

While the present disclosure has been particularly described with reference to exemplary embodiments, it should be understood by those of skilled in the art that various changes in form and details may be made without departing from the spirit and scope of the present disclosure.

The invention claimed is:

1. An air conditioner, comprising:
a cabinet including a first inlet hole, a second inlet hole and a third inlet hole;
a first heat exchanger provided inside the cabinet to exchange heat with indoor air, introduced through the first inlet hole;
a second heat exchanger provided inside the cabinet to exchange heat with outdoor air introduced through the second inlet hole; and
a third heat exchanger provided inside the cabinet between the first heat exchanger and the second heat exchanger along a height direction of the cabinet, and provided to allow outdoor air introduced through the third inlet hole and condensed water generated in the first heat exchanger to exchange heat with each other,
wherein the condensed water generated in the first heat exchanger is transferred to the second heat exchanger through the third heat exchanger,
wherein the condensed water generated in the first heat exchanger and having passed through the first heat exchanger and condensed water having passed through the second heat exchanger are discharged to an outside of the air conditioner while an operation of the air conditioner is stopped,
wherein the condensed water having passed through the second heat exchanger is condensed water generated in the first heat exchanger, having passed through to the second heat exchanger, and having passed through to the third heat exchanger.

2. The air conditioner of claim 1, wherein
the first heat exchanger comprises a water collecting panel in which the condensed water generated in the first heat exchanger is collected,
wherein the condensed water collected in the water collecting panel is moved to the third heat exchanger while the third inlet hole is open.

3. The air conditioner of claim 1, wherein the second heat exchanger comprises:
a distribution panel comprising a plurality of condensate distribution holes to allow condensed water, which passed through the third heat exchanger, to be distributed to the second heat exchanger, the distribution panel disposed on an upper end of the second heat exchanger; and
a water collecting panel disposed at a lower end of the second heat exchanger to collect condensed water passed through the second heat exchanger.

4. The air conditioner of claim 1, further comprising:
a damper configured to selectively open and close the third inlet hole.

5. The air conditioner of claim 4, further comprising:
a filter which is replaceable and disposed between the damper and the third heat exchanger.

6. The air conditioner of claim 1, wherein
the cabinet further comprises a first outlet hole provided to allow air, which passed through the first heat exchanger, to be discharged into an indoor space,
wherein the air conditioner further comprises:
a first duct provided to connect the first inlet hole, the third inlet hole, and the first outlet hole, so as to allow the indoor air, which is introduced through the first inlet hole, to be discharged to the first outlet hole, and to allow the outdoor air, which is introduced through the third inlet hole, to be discharged to the first outlet hole.

7. The air conditioner of claim 6, further comprising:
a first fan installed in the first duct to move the air, which passed through the first heat exchanger, to the first outlet hole.

8. The air conditioner of claim 6, wherein
the cabinet further comprises a second outlet hole provided to allow air, which passed through the second heat exchanger, to be discharged to an outdoor space,
wherein the air conditioner further comprises:
a second duct provided to connect the second inlet hole to the second outlet hole, so as to allow the outdoor air, which is introduced through the second inlet hole, to be discharged to the second outlet hole.

9. The air conditioner of claim 8, wherein
the first duct and the second duct are separated from each other to prevent air moving along the first duct and air moving along the second duct from mixing with each other.

10. The air conditioner of claim 8, further comprising:
a second fan installed in the second duct to move the air, which passed through the second heat exchanger, to the second outlet hole.

11. The air conditioner of claim 1, further comprising:
a compressor provided inside the cabinet below the second heat exchanger along the height direction of the cabinet, the compressor being connected to the first heat exchanger and the second heat exchanger, respectively.

12. An air conditioner comprising:
a cabinet including a first inlet hole, a second inlet hole and a third inlet hole, the first inlet hole, the second inlet hole and the third inlet hole being configured to be opened and closed;
a first heat exchanger provided to exchange heat with indoor air introduced through the first inlet hole;
a second heat exchanger provided to exchange heat with outdoor air introduced through the second inlet hole; and
a third heat exchanger located between the first heat exchanger and the second heat exchanger, and provided to allow outdoor air introduced through the third inlet hole and condensed water generated in the first heat exchanger to exchange heat with each other while the third inlet hole is open,
wherein the condensed water generated in the first heat exchanger is transferred to the second heat exchanger through the third heat exchanger,
wherein the condensed water generated in the first heat exchanger and having passed through the first heat exchanger and condensed water having passed through the second heat exchanger are discharged to an outside of the air conditioner while an operation of the air conditioner is stopped,
wherein the condensed water having passed through the second heat exchanger is condensed water generated in the first heat exchanger, having passed through to the second heat exchanger, and having passed through to the third heat exchanger.

13. The air conditioner of claim 12, wherein
the first heat exchanger, the second heat exchanger, and the third heat exchanger are provided inside cabinet so that the third heat exchanger is located between the first heat exchanger and the second heat exchanger along a height direction of the cabinet.

14. The air conditioner of claim 12, further comprising:
a damper configured to selectively open and close the third inlet hole.

15. The air conditioner of claim 14, further comprising:
a filter which is replaceable and disposed between the damper and the third heat exchanger.

16. The air conditioner of claim 12, wherein
the cabinet further comprises a first outlet hole provided to allow air, which passed through the first heat exchanger, to be discharged into an indoor space,
wherein the air conditioner further comprises:
   a first flow path provided to allow indoor air, which is introduced into the first inlet hole, to be discharged to the first outlet hole by passing through the first heat exchanger; and
   a second flow path provided to allow outdoor air, which is introduced into the third inlet hole, to be discharged to the first outlet hole by sequentially passing through the third heat exchanger and the first heat exchanger, and connected to the first flow path through the first heat exchanger.

17. The air conditioner of claim 16, wherein
the cabinet further comprises a second outlet hole provided to allow air, which passed through the second heat exchanger, to be discharged to an outdoor space,
wherein the air conditioner further comprises:
a third flow path provided to allow outdoor air, which is introduced into the second inlet hole, to be discharged to the second outlet hole by passing through the second heat exchanger.

* * * * *